| (12) United States Patent | (10) Patent No.: | US 9,325,856 B2 |
|---|---|---|
| Lau et al. | (45) Date of Patent: | Apr. 26, 2016 |

(54) VOICE QUALITY DATA PIGGYBACKING ON SIP SIGNALING MESSAGES

(71) Applicant: Verizon Patent and Licensing Inc., Basking Ridge, NJ (US)

(72) Inventors: Priscilla Lau, Fremont, CA (US); Loc B. Vo, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 156 days.

(21) Appl. No.: 13/668,834

(22) Filed: Nov. 5, 2012

(65) Prior Publication Data

US 2014/0126389 A1 May 8, 2014

(51) Int. Cl.
*H04L 12/26* (2006.01)
*H04M 15/00* (2006.01)
*H04L 29/06* (2006.01)

(52) U.S. Cl.
CPC ............ *H04M 15/63* (2013.01); *H04L 65/1006* (2013.01); *H04L 65/1016* (2013.01); *H04L 65/80* (2013.01); *H04L 43/0835* (2013.01); *H04L 43/0847* (2013.01); *H04M 15/41* (2013.01); *H04M 15/43* (2013.01); *H04M 15/57* (2013.01)

(58) Field of Classification Search
CPC ........................................................ H04L 12/26
USPC ................................................. 370/252, 254
See application file for complete search history.

(56) References Cited

U.S. PATENT DOCUMENTS

| 7,173,910 | B2 * | 2/2007 | Goodman ...................... 370/252 |
| 7,218,614 | B1 * | 5/2007 | Leedy ................. H04M 7/0069 370/254 |
| 7,441,429 | B1 * | 10/2008 | Nucci et al. ...................... 70/229 |
| 8,478,890 | B2 * | 7/2013 | Chaturvedi et al. ........... 709/231 |
| 2006/0146792 | A1 * | 7/2006 | Ramachandran et al. .... 370/352 |
| 2006/0291447 | A1 * | 12/2006 | Siliquini et al. .............. 370/352 |
| 2011/0254961 | A1 * | 10/2011 | Putnam ................... H04L 43/08 348/180 |
| 2013/0017779 | A1 * | 1/2013 | Song ................... H04W 76/005 455/39 |

* cited by examiner

*Primary Examiner* — Dang Ton
*Assistant Examiner* — Abdeltif Ajid

(57) ABSTRACT

A call session control function (CSCF) receives, from a first user device engaged in a call with a second user device, a first Session Initiation Protocol (SIP) signaling message piggy-backed with first data related to a voice quality of an inbound direction of the call at the first user device. The CSCF receives, from a second user device engaged in the call with the first user device, a second SIP signaling message piggy-backed with second data related to a voice quality of an inbound direction of the call at the second user device. The CSCF extracts the first data related to the voice quality from the first SIP signaling message, and extracts the second data related to the voice quality from the second SIP signaling message. A charging collection function (CCF) determines a bi-directional voice quality of the call based on the first data and the second data.

25 Claims, 14 Drawing Sheets ued States Patent

US 9,325,856 B2

VOICE QUALITY DATA PIGGYBACKING ON SIP SIGNALING MESSAGES

BACKGROUND

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions with one or more participants.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein use existing SIP signaling messages, required for call termination and call modification, to send voice quality data related to a call to the network. The network may process the voice quality data piggybacked, or inserted in, the SIP signaling messages to generate a quality report that describes the voice quality from both ends of the call. By using SIP signaling messages already being sent for purposes of call termination or call modification, exemplary embodiments described herein do not generate any additional SIP signaling traffic.

Figure 1:
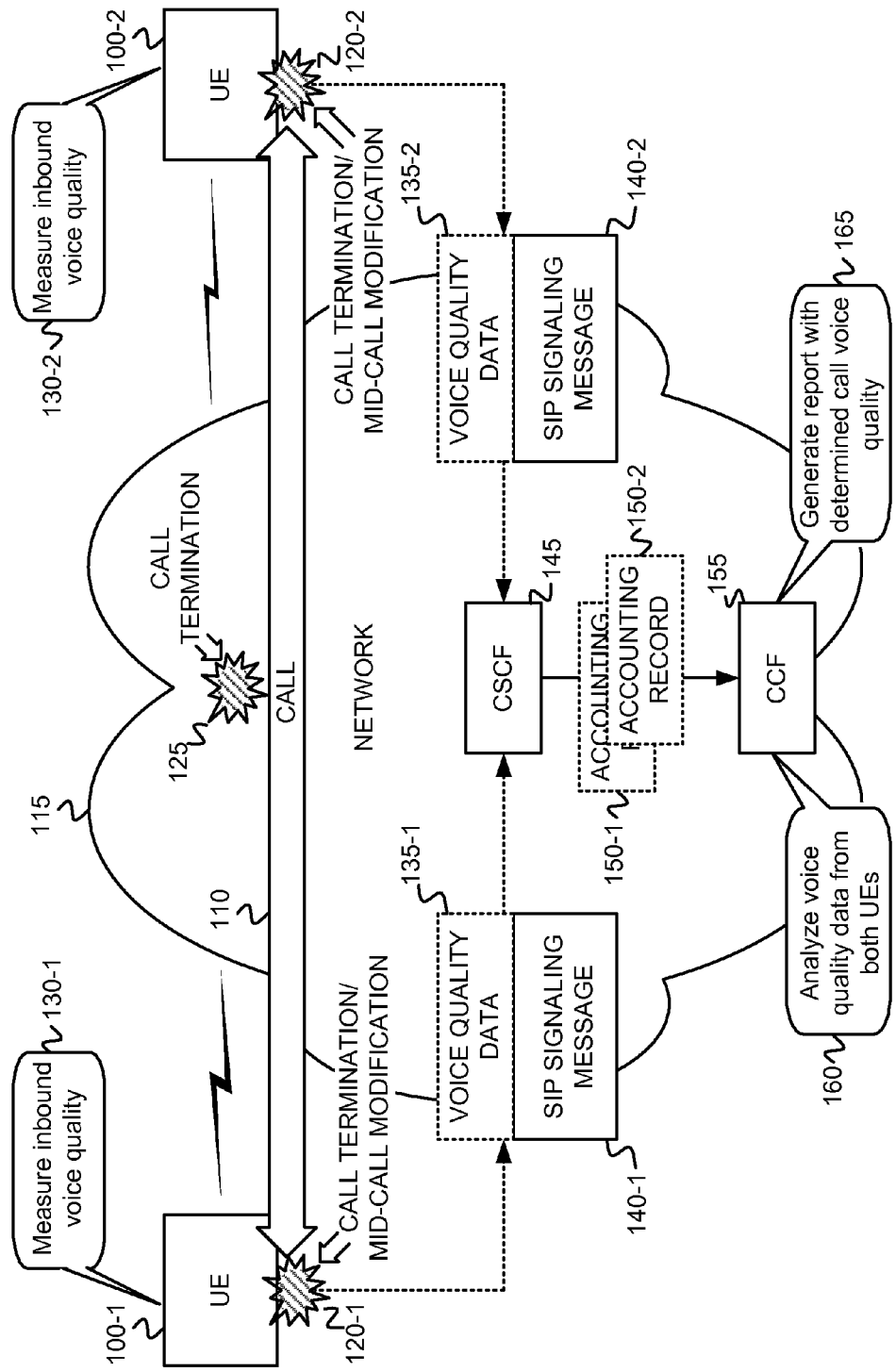
FIG. 1 illustrates an overview of the piggybacking of voice quality data on SIP signaling messages sent from User Equipment (UE) during call termination or mid-call modification.

FIG. 1 illustrates an overview of the piggybacking of voice quality data on SIP signaling messages sent from User Equipment (UE) during call termination or mid-call modification. As shown in FIG. 1, UEs 100-1 and 100-2 engage in a call 110 via a network 115. UEs 100-1 and 100-2 may include any type of electronic device that may engage in a call. UEs 100-1 and 100-2 may include, for example, a telephone (land-line or mobile), a personal digital assistant (PDA), or a computer (e.g., tablet, desktop, palmtop, or laptop).

Subsequent to establishing call 110, call 110 may be terminated by UE 100-1, UE 100-2, or network 115. Additionally, subsequent to establishing call 110, call 110 may be modified mid-call by UE 100-1 or UE 100-2. A mid-call modification may include a call transfer, a call hold, a change of media type from voice call to video call, or a codec change, etc. FIG. 1 depicts a call termination or mid-call modification 120-1 initiated by UE 100-1, and a call termination or mid-call modification 120-2 initiated by UE 100-2. FIG. 1 further depicts a call termination 125 initiated by network 115. In other examples, UE 100-1 or UE 100-2 may initiate call termination.

Prior to call termination/mid-call modification 120-1 or 120-2, or call termination 125, UE 100-1 may measure 130-1 the inbound voice quality of call 110 at UE 100-1 to produce accumulative voice quality data 135-1 associated with call 110 until the next SIP signaling event occurs (i.e., when SIP signaling is exchanged between the UE 100-1 and network 115 for call modification or call termination). Voice quality data may include several different measurements of the voice quality metrics (e.g., delay, packet error rate, etc.) and the start timestamp and stop timestamp of the measuring duration. UE 100-1 may then piggyback accumulative voice quality data 135-1 on a next SIP signaling message 140-1 sent to a Call Session Control Function (CSCF) 145 in the IMS network within network 115. The voice quality data 135-1 may be inserted as an XML part to the SIP signaling message or carried by new SIP headers in the SIP signaling message. If this is a mid-call modification, UE 100-1 will start a new measuring period and continue taking accumulative voice quality measurements until the next signaling event occurs (e.g., another call modification or call termination.) As a result, UE 100-1 may send voice quality data 135-1 to CSCF 145 one time or multiple times for call 110, depending on the number of mid-call modifications.

Additionally, or alternatively, subsequent to call termination/mid-call modification 120-1 or 120-2, or call termination 125, UE 100-2 may measure 130-2 the inbound voice quality of call 110 at UE 100-2 to produce accumulative voice quality data 135-2 associated with call 110 along with the start time and end time of the measuring period. UE 100-2 may then piggyback voice quality data 135-2 on a next SIP signaling message 140-2 sent to CSCF 145 in the IMS network within network 115 in a similar manner as described above for UE 100-1.

Upon receipt of SIP signaling message 140-1, CSCF 145, the entity responsible for generating the accounting record for the call for UE 100-1, may extract and store the piggybacked voice quality data 135-1 from the received SIP signaling message from UE 101-1 before sending the SIP signaling message to the next node. CSCF 145 may include voice quality data 135-1 in the next accounting record 150-1 that it generates for the call. CSCF 145 may send the generated accounting record 150-1 to a Charging Collection Function (CCF) 155. CSCF 145 may send accounting to CCF 155 via a Charging Data Function (CDF) (not shown in FIG. 1). Accounting record 150-1 may include voice quality data 135-1 and regular accounting data for charging. Furthermore, upon receipt of SIP signaling message 140-2, CSCF 145, as the entity responsible for generating the accounting record for the call for UE 100-2, may extract the piggybacked voice quality data 135-2 and may generate an accounting record 150-2. CSCF 145 may send the generated accounting record 150-2 to Charging Collection Function (CCF) 155. Accounting record 150-2 may include voice quality data 135-2 and regular accounting data for charging.

Upon receipt of accounting records 150-1 and 150-2 (and possibly other accounting records associated with call 110), CCF 155 may, as shown in FIG. 1, analyze 160 the voice quality data from both of UEs 100-1 and 100-2. CCF 155 may extract voice quality data 135-1 from accounting record 150-1, and voice quality data 135-2 from accounting record 150-2. CCF 155 may analyze voice quality data 135-1 and 135-2 to determine a bi-directional voice quality of call 110 using the voice quality data from both ends of call 110. CCF 155 may generate 165 a report with the determined bi-directional voice quality for the entire call 110 or for different segments of the call. In some implementation, CCF 155 may send voice quality 135-1 and 135-2 to an external entity responsible for analyzing the data and report generation instead of performing these functions itself. FIG. 1 shows the same CSCF 145 for both UE 100-1 and UE 100-2 and one CCF 155 for simplicity. In other examples, different CSCFs 145 and different CCFs 155 may support UE 100-1 and UE 100-2. In this case, CCF 155 may send voice quality data 135-1 and 135-2 to a common server external to CCF 155.

Figure 2:
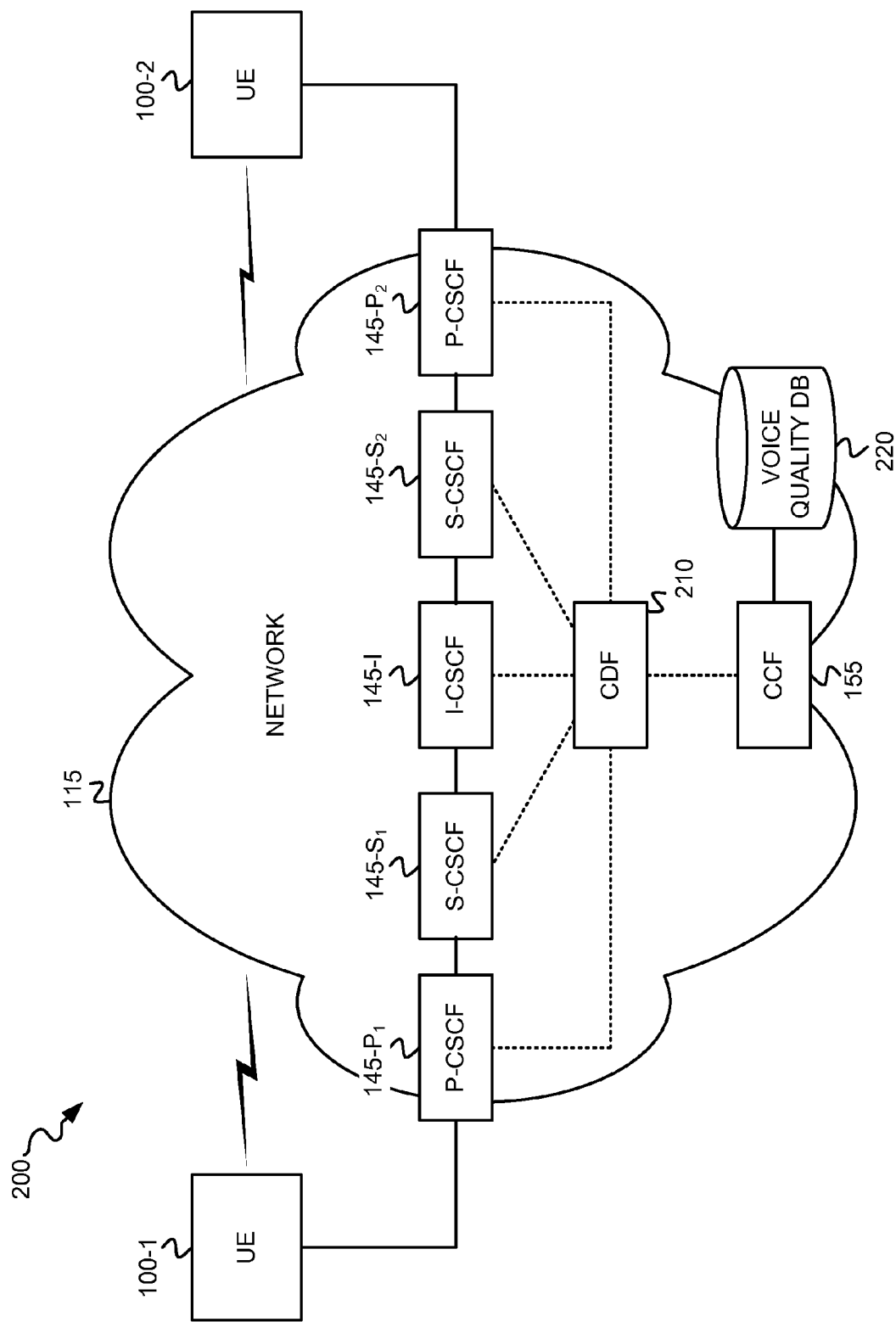
FIG. 2 depicts an exemplary network environment in which voice quality data for a call may be piggybacked on SIP signaling messages sent from UEs during call termination or mid-call modification.

FIG. 2 depicts an exemplary network environment 200 in which voice quality data for a call may be piggybacked on SIP signaling messages sent from UEs during call termination or mid-call modification. As shown, network environment 200 may include UEs 100-1 and 100-2 (generically and individually referred to herein as "UE 100") connected with network 115 via wired or wireless links. As further shown, network 115 may include a Proxy CSCF (P-CSCF) 145-$P_1$, a serving CSCF (S-CSCF) 145-$S_1$, an Interrogating CSCF (I-CSCF) 145-I, a S-CSCF 145-$S_2$, a P-CSCF 145-$P_2$, a Charging Data Function (CDF) 210, Charging Collection Function 155, and a voice quality database (DB) 220. P-CSCF 145-$P_1$, S-CSCF 145-$S_1$, I-CSCF 145-I, S-CSCF 145-$S_2$, and P-CSCF 145-$P_2$ may be generically and individually referred to herein as "CSCF 145".

Network 115 may include one or more networks of any type, including an IMS network. Network 115 may include one or more wired networks, such as, for example, a local area network (LAN), a wide area network (WAN), a metropolitan area network (MAN), a cable network, a Public Switched Telephone Network (PSTN), an intranet, and/or the Internet. Network 115 may further include one or more wireless-based networks, such as, for example, a wireless satellite network and/or a wireless public land mobile network (PLMN). The wireless PLMN may include a Code Division Multiple Access (CDMA) 2000 PLMN, a Global System for Mobile Communications (GSM) PLMN, a Long Term Evolution (LTE) PLMN and/or other types of PLMNs. Network 115 may implement circuit-switched or packet-switched telephony. The packet-switched telephony may include IP based telephony. The IMS network may use SIP for voice and multimedia session control.

P-CSCF 145-$P_1$ acts as an edge of the IMS network through which UE 100-1 obtains access. P-CSCF 145-$P_1$ maintains an awareness of all IMS endpoints (including UE 100-1) that are currently registered with the IMS network, and performs various manipulations of SIP signaling messages that are arriving from, or being sent to, the IMS endpoints (e.g., UE 100-1) that are registered with S-CSCF 145-$S_1$. P-CSCF 145-$P_1$ maintains a connection with S-CSCF 145-$S_1$ for UE 100-1.

S-CSCF 145-$S_1$ processes all originating and terminating SIP requests and responses associated with endpoints registered with S-CSCF 145-$S_1$ (including UE 100-1). S-CSCF 145-$S_1$ routes the SIP signaling towards its destination (e.g., towards UE 100-1 via P-CSCF 145-$P_1$ or toward I-CSCF 145-I for UE 100-2). S-CSCF may route the SIP signaling request to application server (e.g., Telephony Application Server) for further processing.

I-CSCF 145-I passes SIP signaling to/from S-CSCF 145-$S_1$ and S-CSCF 145-$S_2$. I-CSCF 145-I queries a Home Subscriber Server (HSS) using diameter signaling (not shown) to learn the identity of the S-CSCF assigned to a given UE so that it can properly forward the SIP signaling.

S-CSCF 145-$S_2$ processes all originating and terminating SIP requests and responses associated with endpoints registered with S-CSCF 145-$S_2$ (including UE 100-2). S-CSCF 145-$S_2$ routes the SIP signaling towards its destination (e.g., towards UE 100-2 via P-CSCF 145-$P_2$ or towards UE 100-1 via I-CSCF 145-I or S-CSCF 145-$S_1$.

P-CSCF 145-$P_2$ acts as an edge of the IMS network through which UE 100-2 obtains access. P-CSCF 145-$P_2$ maintains an awareness of all IMS endpoints (including UE 100-2) that are currently registered with the IMS network, and performs various manipulations of SIP signaling messages that are arriving from, or being sent to, the IMS endpoints (e.g., UE 100-2) that are registered with CSCF 145 $S_2$. P-CSCF 145-$P_2$ maintains a connection with S-CSCF 145-$S_2$ for UE 100-2.

Charging Data Function (CDF) 210 receives accounting information, including voice quality data for voice calls, from, for example, CSCF 145's (e.g., P-CSCF 145-$P_1$, S-CSCF 145-$S_1$, S-CSCF 145-$S_2$, or P-CSCF 145-$P_2$). Charging Collection Function (CCF) 155 collects accounting records from CDF 210 and stores the voice quality information in voice quality DB 220. Voice quality DB 220 may include a data structure (e.g., a database) that stores voice quality information received from CCF 155 that may be selectively retrieved. P-CSCF 145-$P_1$, S-CSCF 145-$S_1$, S-CSCF 145-$S_2$, or P-CSCF 145-$P_2$, CDF 210 and CCF 155 may each include functionality implemented in multiple, different network devices, or in a same, single network device. In the case of more than one CCF 155 receiving accounting records for a same call, each CCF 155 may send the voice quality data to voice quality DB 220 that may be external to CCF 155. The handling of regular accounting information for charging may be performed in accordance with existing processes.

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2. For example, network environment 200 may also include a Telephony Application Server (TAS) in network 115. FIG. 2 depicts a single CDF 210 and a single CCF 155 for purposes of clarity. For some calls, one CCF 155 (and CDF 210) may receive accounting record (including voice quality data) from the calling UE 100-1 and another CCF 155 (and CDF 210) may receive accounting record from the called UE 100-2. In this case, each CCF 155 may send the voice quality data of a call to a common voice quality DB 220 which may be external to the CCF 155 and a common processing unit may correlate the measured data from both ends and a common report generation unit may generate the bi-directional voice quality report for the call.

Figure 3:
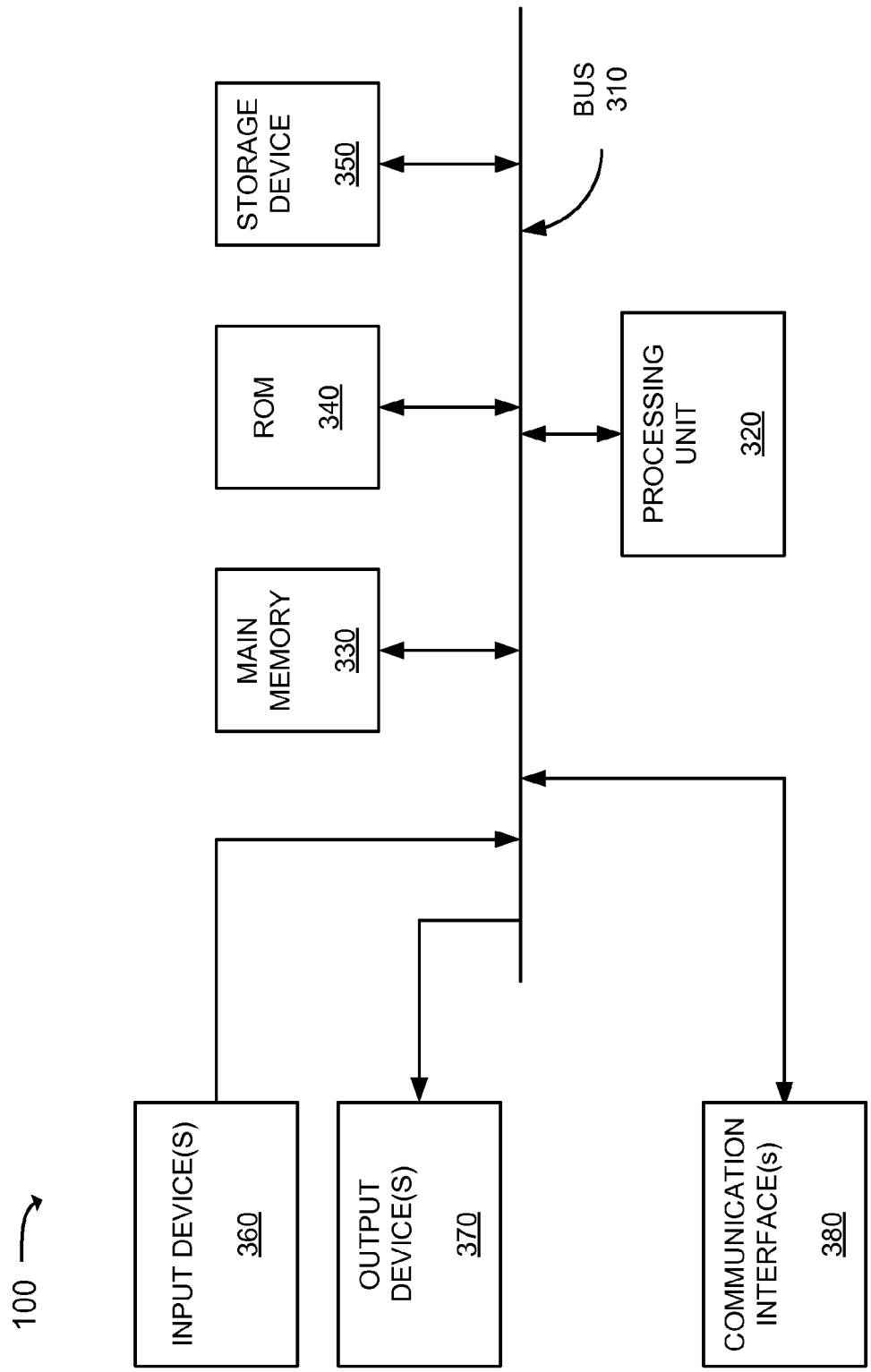
FIG. 3 is a diagram that depicts exemplary components of a UE of FIGS. 1 and 2.

FIG. 3 is a diagram that depicts exemplary components of UE 100. CSCF 145, CDF 210, CCF 155 and voice quality DB 220 may be similarly configured. UE 100 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of UE 100.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium." The process/methods set forth herein can be implemented as instructions that are stored in main memory 330, ROM 340 and/or storage device 350 for execution by processing unit 320.

The software instructions may be read into memory 330 from another computer-readable medium, such as storage device 350, or from another device via communication interface 380. The software instructions contained in main memory 330 may cause processor 320 to perform operations or processes that will be described later. Alternatively, hard-wired circuitry may be used in place of or in combination with software instructions to implement processes consistent with the principles of the invention. Thus, exemplary implementations are not limited to any specific combination of hardware circuitry and software.

Input device 360 may include one or more mechanisms that permit an operator to input information to UE 100, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables UE 100 to communicate with other devices and/or systems. For example, communication interface(s) 380 may include wired and/or wireless transceivers for communicating via network 115.

Communication interface(s) 380 may include functionality for measuring the voice quality on inbound calls received at a transceiver of interface(s) 380. The measured voice quality may include, for example, measurements of speech signal level, noise level, echo, delay, packet loss, error rate, jitter, or other quality metrics. Measuring the voice quality may include using algorithms such as Perceptual Evaluation of Speech Quality (PESQ), Perceptual Speech Quality Measure (PSQM), Perceptual Analysis/Measurement System (PAMS) or Mean Opinion Score (MOS).

The configuration of components of UE 100 illustrated in FIG. 3 is for illustrative purposes. Other configurations may be implemented. Therefore, UE 100 may include additional, fewer and/or different components than those depicted in FIG. 3.

Figure 4:
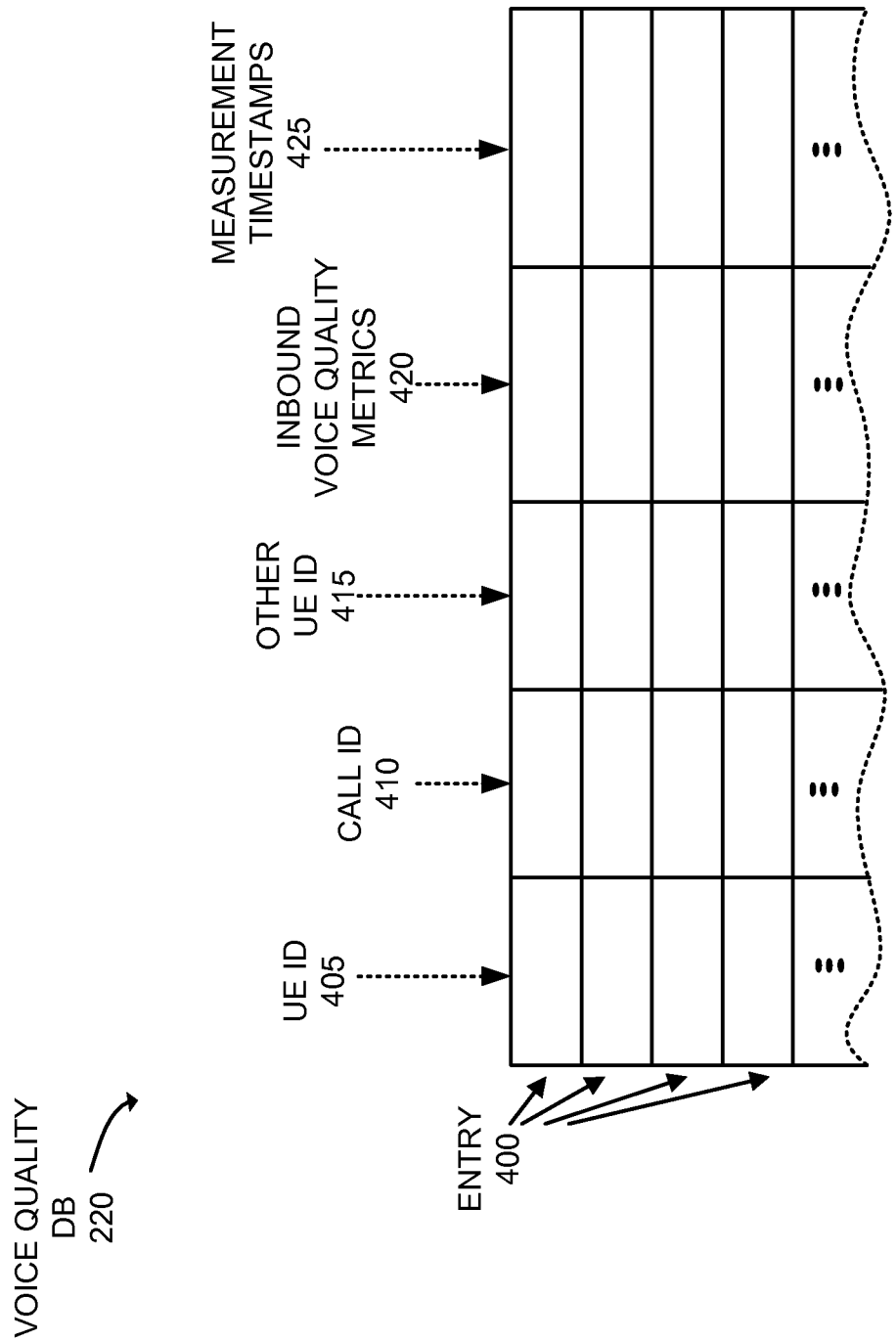
FIG. 4 illustrates exemplary details of the voice quality database of FIG. 2.

FIG. 4 illustrates exemplary details of voice quality DB 220. As shown, each entry 400 of DB 220 may include a UE identifier (ID) field 405, a call ID field 410, an other UE ID field 415, an inbound voice quality metrics field 420, and measurement timestamps field 425.

UE ID field 405 includes a unique identifier for a UE 100 from which the voice quality information stored in a respective entry 400 originated. Call ID field 410 includes a unique identifier that identifies a call that is referenced in a respective entry 400. Other UE ID field 415 includes a unique ID that identifies the other UE 100 at the other end of the call identified in call ID field 410 with the UE identified in UE ID field 405. Inbound voice quality field 420 includes voice quality metric measurements (e.g., $M_1$ for delay, $M_2$ for packet error rate, $M_3$ for loss packet rate, etc.) related to the call identified in call ID field 410 received in a piggybacked SIP signaling message from the UE 100 identified in UE ID field 405. Measurement timestamps field 425 includes the start timestamp and the stop timestamp for the measurement duration of the voice quality metric measurements in field 420.

The number and content of the fields of each entry 400 of voice quality DB 220 in FIG. 4 is for illustrative purposes. Each entry 400 of voice quality DB 220 may include additional, fewer and/or different fields than those depicted in FIG. 4.

Figure 5:
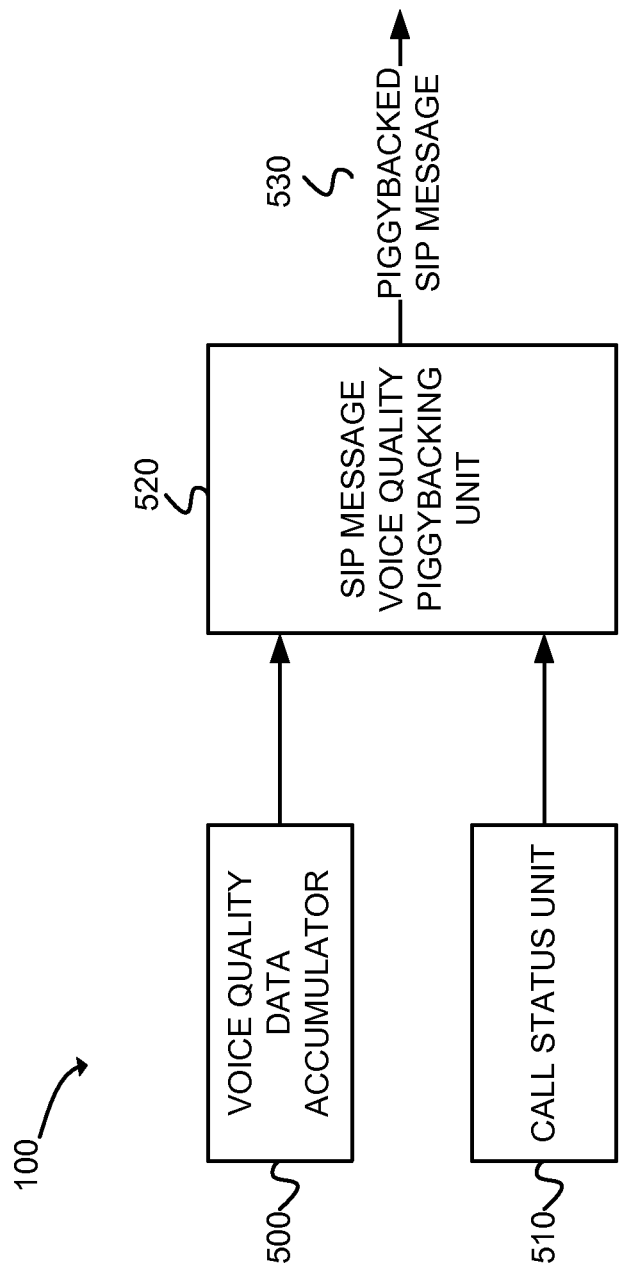
FIG. 5 is a diagram of exemplary functional components of a UE of FIGS. 1 and 2.

FIG. 5 is a diagram of exemplary functional components of UE 100. The functional components shown in FIG. 5 may be implemented in hardware and/or software within UE 100. In one implementation, the functional components of FIG. 5 may be implemented as instructions stored in memory 330 that are executed by processing unit 320. The functional components of UE 100 may include a voice quality data accumulator 500, a call status unit 510, and a SIP message voice quality piggybacking unit 520.

Voice quality data accumulator 500 may process and store voice quality data measured at, and received from, communication interface(s) 380. Accumulator 500 may provide the voice quality data to unit 520 for piggybacking on SIP messages. As an implementation option, voice quality data accumulator 500 may measure voice quality data accumulatively for a fixed period of time (e.g., 5 minutes) and send the voice quality data to SIP Message Voice Quality Piggyback Unit 520 at the end of the fixed measuring period. In this case, SIP Message Voice Quality Piggyback Unit 520 may aggregate the voice quality data received from voice quality data accumulator 500. Another implementation option is for voice quality data accumulator 500 to collect and accumulate all measurements and only send data to SIP message voice quality piggybacking unit 520 whenever there is a mid-call modification or termination detected by call status unit 510. In this case, the transmission of voice quality data by voice quality data accumulator 500 to the SIP message voice quality piggybacking unit 520 may be triggered by call status unit 510 or requested by SIP message voice quality piggybacking unit 520.

Call status unit 510 may monitor the status of ongoing calls to determine whether each of the calls is terminated, or modified mid-call. Call status unit 510 may provide an indication of call termination, or mid-call modification, for a call to unit 520.

SIP message voice quality piggybacking unit 520 may, based on indications of call termination, or mid-call modification, for a particular call received from call status unit 510, may piggyback the aggregated voice quality data received from accumulator 500 on a next outgoing SIP message 530.

The configuration of functional components of UE 100 in FIG. 5 is for illustrative purposes only. Other configurations may be implemented. UE 100 may include additional, fewer, different and/or differently arranged components than those depicted in FIG. 5.

Figure 6:
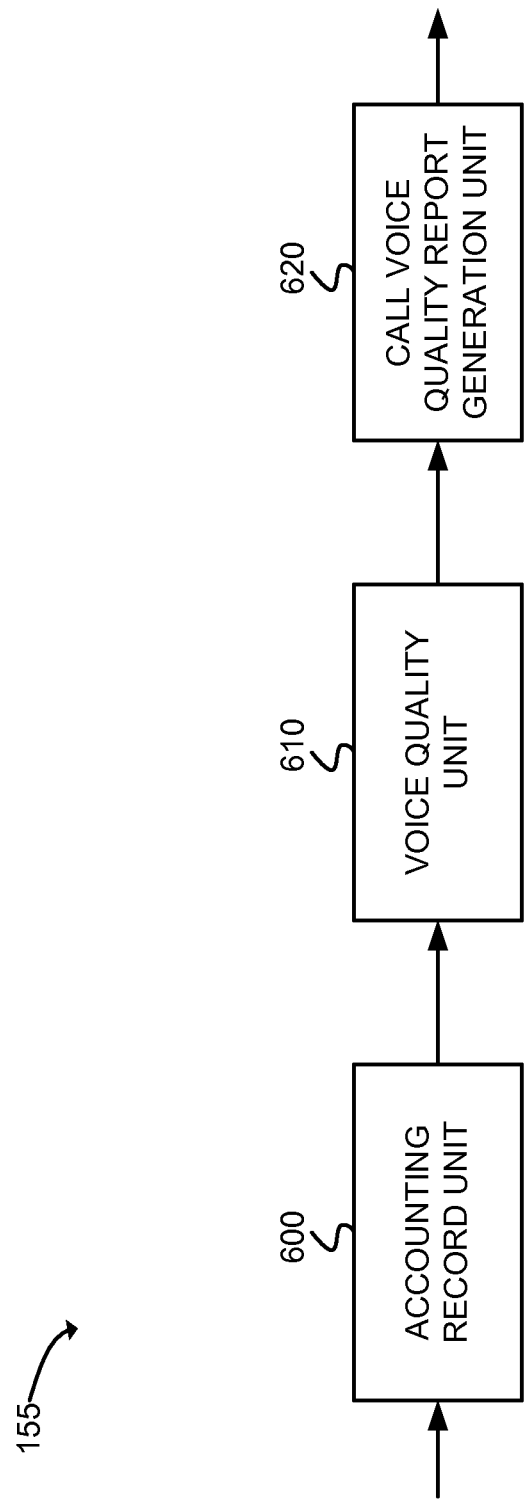
FIG. 6 is a diagram of exemplary functional components of the Charging Collection Function of FIGS. 1 and 2.

FIG. 6 is a diagram of exemplary functional components of CCF 155. The functional components shown in FIG. 6 may be implemented in hardware and/or software within CCF 155. For example, in one implementation, the functional components of FIG. 6 may be implemented as instructions stored in memory 330 that are executed by processing unit 320. The functional components of CCF 155 may include an accounting record unit 600, a voice quality unit 610, and a call voice quality report generation unit 620.

Accounting record unit 600 may receive accounting records from CSCF 145 directly or via CDF 210 and may extract the voice quality data from the accounting records and store the data in appropriate fields of voice quality DB 220. Voice quality unit 610 may retrieve all voice quality data for a specific call from voice quality DB 220, and may process the voice quality data to determine a bi-directional voice quality of the call. The voice quality data retrieved by voice quality unit 610 may include the inbound voice quality of the call from both ends (i.e., UE 100-1 and UE 100-2) of the call. Voice quality unit 610 may pass the determined bi-directional voice quality of the call to call voice quality report generation unit 620. Call voice quality report generation unit 620 may generate a voice quality report for a specific call based on the bi-directional voice quality of the call determined by voice quality unit 610.

The configuration of functional components of CCF 155 in FIG. 6 is for illustrative purposes only. Other configurations may be implemented. CCF 155 may include additional, fewer, different and/or differently arranged components than those depicted in FIG. 6. For example, voice quality DB 220, voice quality unit 610, and voice quality report generation unit 620 may be integrated in different manners, or may be implemented separately and independently of CCF 155, whose main function is collecting accounting data for charging. The processing of the normal accounting data by the CSCF 145, CDF 210, and CCF 155 occurs in accordance with existing processes. In many implementations, CDF 210 and CCF 155 may be integrated together physically.

Figure 7:
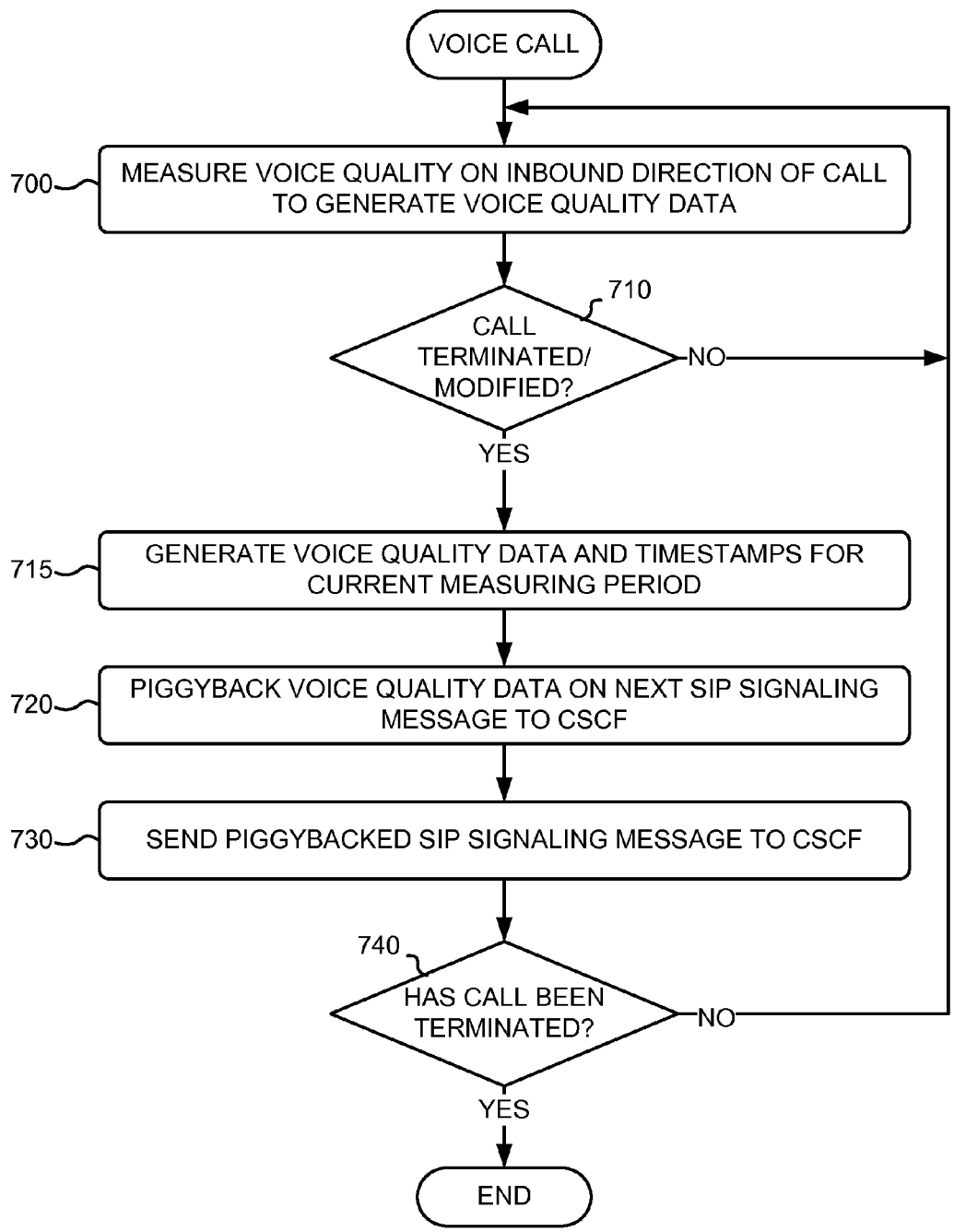
FIG. 7 is a flow diagram illustrating an exemplary process for measuring voice quality on an inbound direction of a call at a UE, and piggybacking corresponding voice quality data on a next SIP signaling message to a Call Session Control Function.

FIG. 7 is a flow diagram illustrating an exemplary process for measuring voice quality on an inbound direction of a call at a UE 100, and piggybacking corresponding voice quality data on a next SIP signaling message from UE 100 to a CSCF. The exemplary process of FIG. 7 may be performed by processing unit 320, in conjunction with communication interface 380, of UE 100. The exemplary process of FIG. 7 is described herein with reference to the messaging diagram of FIG. 8. The exemplary process of FIG. 7 may be performed by UE 100-1 or 100-2 subsequent to the establishment of a voice call between UE 100-1 or 100-2.

Figure 8:
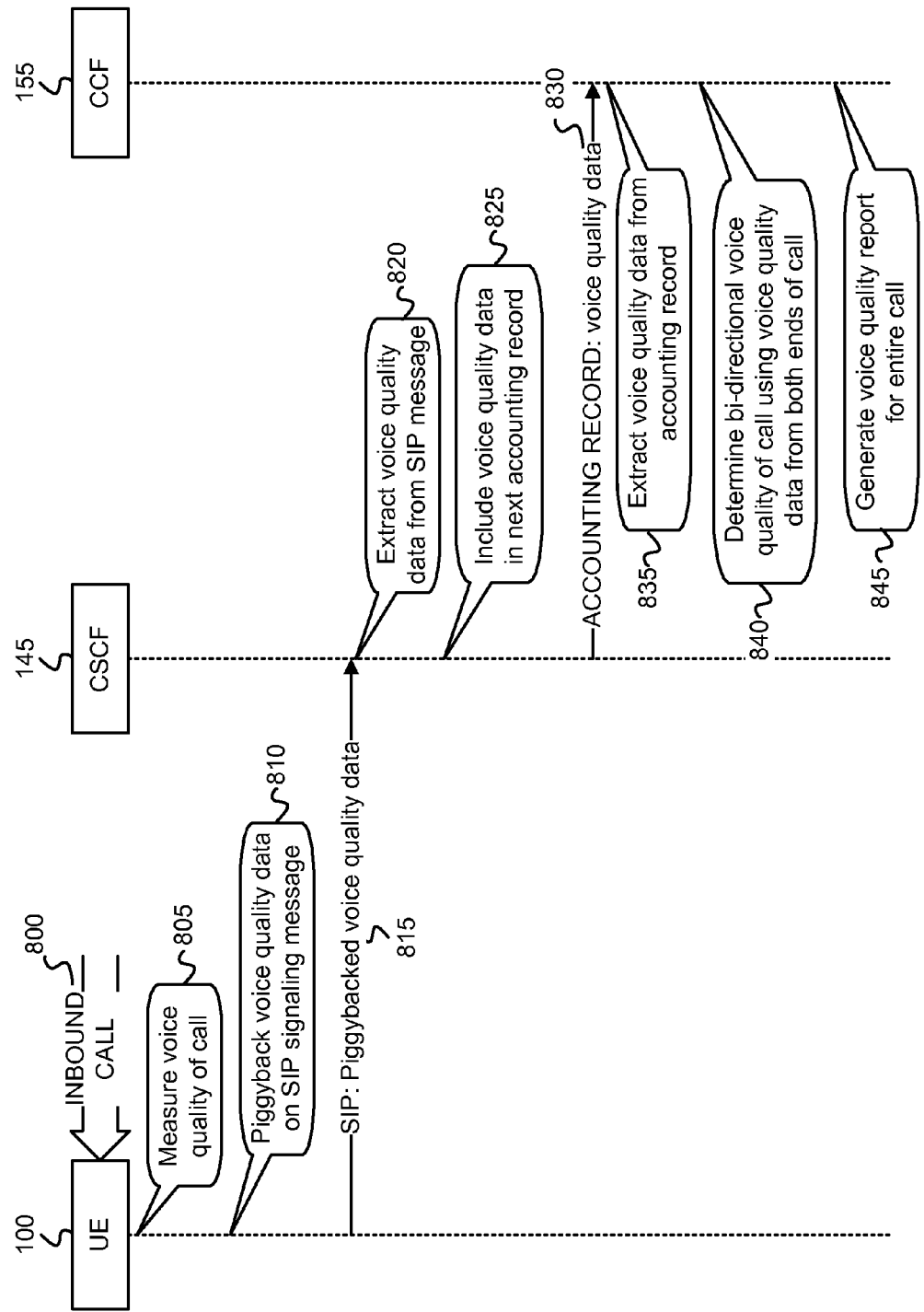
FIG. 8 is a messaging diagram that depicts exemplary messaging associated with the processes of FIGS. 7, 9 and 10.

The exemplary process may include measuring the voice quality on an inbound direction of a call to generate voice quality data (block 700). Subsequent to establishment of a voice call between UE 100 and another UE (e.g., between UE 100-1 and UE 100-2), communication interface 380 of UE 100 may measure the voice quality on the inbound direction of the voice call. Communication interface 380 may use existing voice quality measuring techniques to measure the voice quality of the call, and to generate the voice quality data. Voice quality data accumulator 500 may obtain the voice quality data from communication interface 380. The messaging diagram of FIG. 8 depicts UE 100 measuring 805 the voice quality of an inbound call 800.

UE 100 may determine whether the call is being terminated or modified (block 710). The user of UE 100 may end the call via input device 360, or UE 100 may receive a SIP BYE message from CSCF 145 indicating a network-initiated call termination or a call release initiated by the remote end of the call. The user of UE 100, via use of input device 360, may initiate a mid-call modification, UE 100 may receive a SIP RE-INVITE message from CSCF 145 indicating a mid-call modification originating from a remote end of the call (e.g., from the other UE engaged in the call). The mid-call modification may include, for example, a call transfer, a call hold, a change of media type from voice call to video call, or a codec change. Call status unit 510 may determine whether the call is being terminated or modified based on the user input into UE 100, or based on the SIP messages received from CSCF 145.

If the call isn't being terminated or modified (NO—block 710), then the exemplary process may return to block 700 with another measurement of the voice quality on the inbound direction of the call. If the call is being terminated or modified (YES—block 710), then UE 100 may generate voice quality data and timestamps for the current measuring period (including accumulative metric measurements and their associated timestamps) (block 715) and piggyback the voice quality data on a next SIP signaling message to CSCF 145 (block 720). SIP voice quality piggybacking unit 520 of UE 100 may, based on an indication of call termination or modification from call status unit 510, obtain voice quality data for the call from voice quality data accumulator 500 and piggyback the voice quality data on a next SIP signaling message 530. The next SIP signaling message 530 may include a SIP BYE message in the case of a call termination initiated by UE 100, a SIP 200 OK message in the case of a network-initiated call termination or a remote-end initiated mid-call modification, or a SIP RE-INVITE message in the case of a mid-call modification initiated by UE 100. The messaging diagram of FIG. 8 depicts UE 100 piggybacking 810 the voice quality data on a next SIP signaling message.

UE 100 may send the piggybacked SIP signaling message to CSCF 145 (block 730). FIG. 8 depicts SIP message 815, piggybacked with the voice quality data, being sent from UE 100 to CSCF 145. The exemplary process of FIG. 7 may return to block 700 with another measurement of the voice quality on an inbound direction of the call if the call has not been terminated (block 740). The exemplary process of FIG. 7 may be repeated for each call at UE 100.

Figure 9:
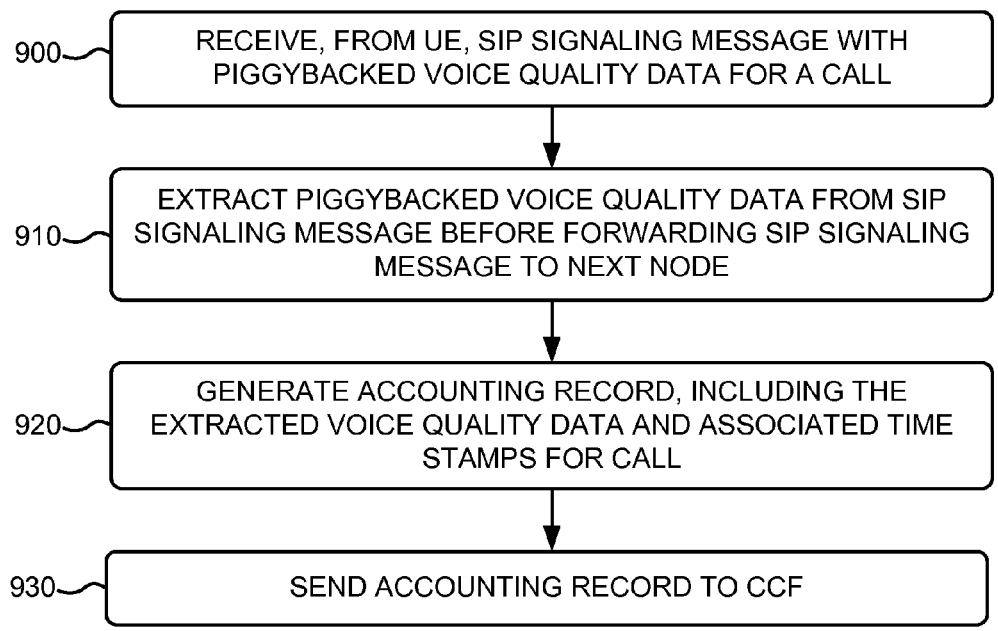
FIG. 9 is a flow diagram illustrating an exemplary process for generating an accounting record based on voice quality data for a call extracted from a SIP signaling message received from a UE.

FIG. 9 is a flow diagram illustrating an exemplary process for including voice quality data extracted from a SIP signaling message received from a UE 100 in a next accounting record sent from CSCF 145 to CCF 155. In one embodiment, the exemplary process of FIG. 9 may be performed by processing unit 320 of CSCF 145. In another embodiment, the exemplary process of FIG. 9 may be performed by a processing unit of a Telephony Application Server (TAS) and the TAS may perform the blocks of the exemplary process of FIG. 9, instead of CSCF 145. The exemplary process of FIG. 9 is described herein with reference to the messaging diagram of FIG. 8.

The exemplary process may include receiving, from UE 100, a SIP signaling message with piggybacked voice quality data for a call (block 900). FIG. 8 depicts CSCF 145 receiving a piggybacked SIP signaling message 815 from UE 100. CSCF 145 may extract the piggybacked voice quality data from the received SIP signaling message before forwarding the SIP signaling message to a next node (block 910). As shown in FIG. 8, upon receipt of piggybacked SIP signaling message 815, CSCF 145 may extract 820 the piggybacked voice quality data from message 815.

CSCF 145 may generate an accounting record, including the extracted voice quality data and associated time stamps for the call (block 920). The accounting record may include various data associated with the call between UE 100-1 and 100-2, including the voice quality data and associated time stamps for the call extracted from the piggybacked SIP signaling message and other data that may be required for charging. FIG. 8 depicts CSCF 145 including the extracted voice quality data in the next accounting record 825 for the call. CSCF 145 may send the generated accounting record to CCF 155 (block 930). FIG. 8 shows CSCF 145 sending an accounting record 830, with the voice quality data, to CCF 155. Alternatively, though not shown in FIG. 8, CSCF 145 may send signaling message 815 without extracting the voice quality data to a Telephony Application (TAS). In this case, TAS may perform the functions of extracting voice quality data and including the extracted data in the next accounting record to CCF 155.

Figure 10:
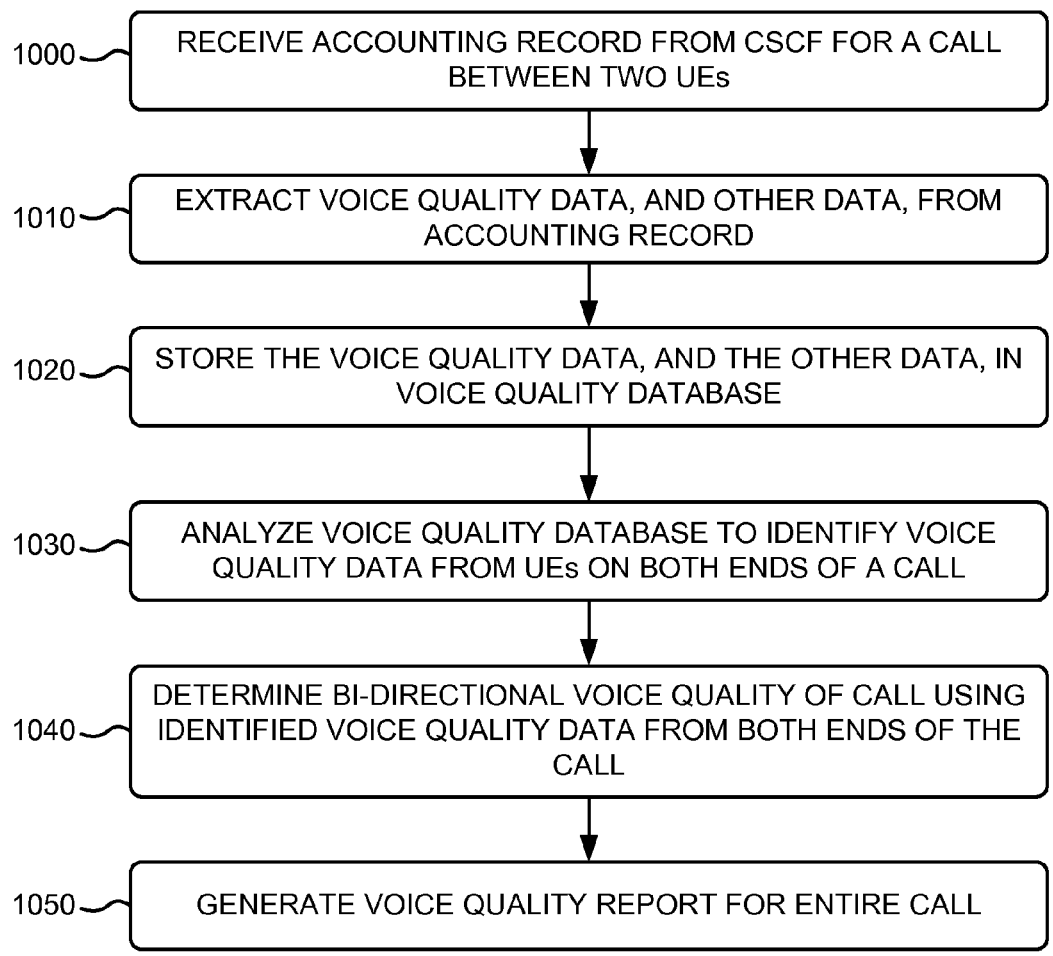
FIG. 10 is a flow diagram illustrating an exemplary process for determining bi-directional voice quality of a call using voice quality data from both ends of the call sent via piggybacked SIP signaling messages.

FIG. 10 is a flow diagram illustrating an exemplary process for determining bi-directional voice quality of a call using voice quality data from both ends of the call sent via piggybacked SIP signaling messages. The exemplary process of FIG. 10 may be performed by processing unit 320 of CCF 155. The exemplary process of FIG. 10 may be repeated for each accounting record received at CCF 155 from CSCF 145. The exemplary process of FIG. 10 is described herein with reference to the messaging diagram of FIG. 8.

The exemplary process may include CCF 155 receiving an accounting record from CSCF 145 for a call between UEs 100-1 and 100-2 (block 1000), extracting voice quality data for the call, and other data, from the accounting record (block 1010), and storing the extracted voice quality data, and optionally the other data (e.g., time stamps), in voice quality DB 220 (block 1020). Accounting record unit 600 may receive the accounting record from CSCF 145 (directly or via CDF 210) and may extract the voice quality data for the call from the accounting record. Accounting record unit 600 may store the voice quality data in appropriate fields of voice quality DB 220. For example, accounting record unit 600 may store the UE identifier of UE 100 which originated the voice quality data in UE ID field 405, and may store the UE identifier of the other UE 100 engaged in the call in other UE ID field 415. Accounting record unit 600 may further store an identifier associated with the call in call ID field 410, and the voice quality measurements extracted from the accounting record in inbound voice quality field 420. Accounting record unit 600 may store the start timestamp and stop timestamp extracted from the accounting record in timestamps field 425. The start and stop timestamps may be used to make sure the entire call duration has been accounted for in the voice quality report generation and/or to assign weights to the associated measurements during analysis and processing. The messaging diagram of FIG. 8 depicts CCF 155 receiving accounting record 830 from CSCF 145, and extracting 835 the voice quality data from accounting record 830.

CCF 155 may analyze voice quality DB 220 to identify voice quality data from UEs on both ends of a call (block 1030). Voice quality unit 610 may retrieve and store voice quality data for a specific call from voice quality DB 220, including retrieving the inbound voice quality data of the call from both ends of the call. For example, voice quality unit 610 may index voice quality DB 220 to locate entries 400 whose call ID fields 415 match the call ID of the call. Voice quality unit 610 may retrieve the voice quality data stored in inbound voice quality field 420 and field 425 of each located entry 400. Voice quality unit 610 may retrieve the UE ID field 405 and use it to identify the transmission direction of the voice quality data.

CCF 155 may determine bi-directional voice quality of the call using the identified voice quality data from both ends of the call (block 1040), and may generate a voice quality report for the entire call (block 1050). Voice quality unit 610 may process the voice quality data for both ends of the call identified in block 1030 to determine the bi-directional voice quality of the call. Call voice quality report generation unit 620 of CCF 155 may generate a voice quality report using the bi-directional voice quality for the call determined in block 1040. The messaging diagram of FIG. 8 depicts CCF 155 determining 840 the bi-directional voice quality of the call using voice quality data from both ends of the call, and generating 845 a voice quality report for the entire call.

Figure 11:
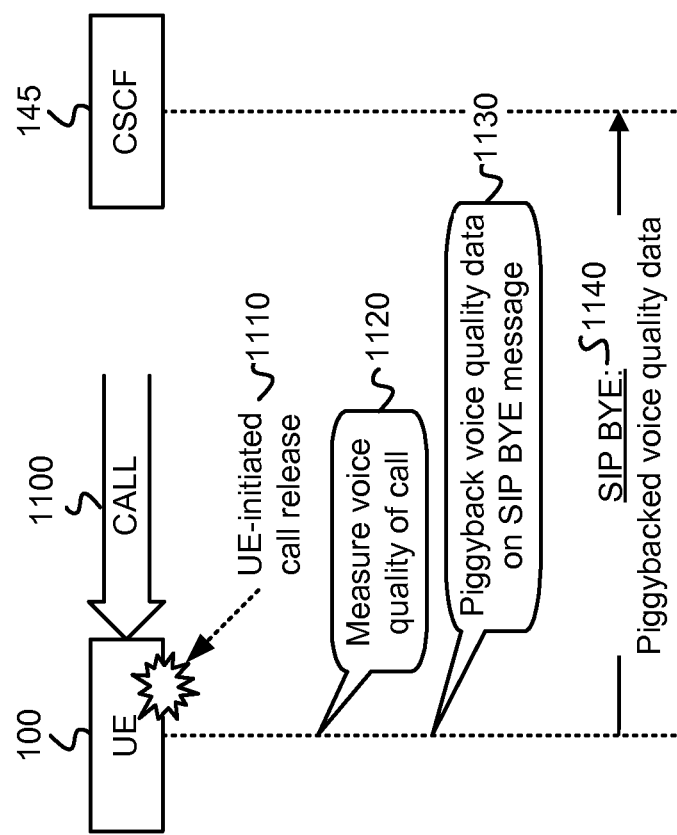
FIGS. 11-14 depict specific messaging examples associated with piggybacking voice quality data on SIP messages from a UE.
Figure 12:
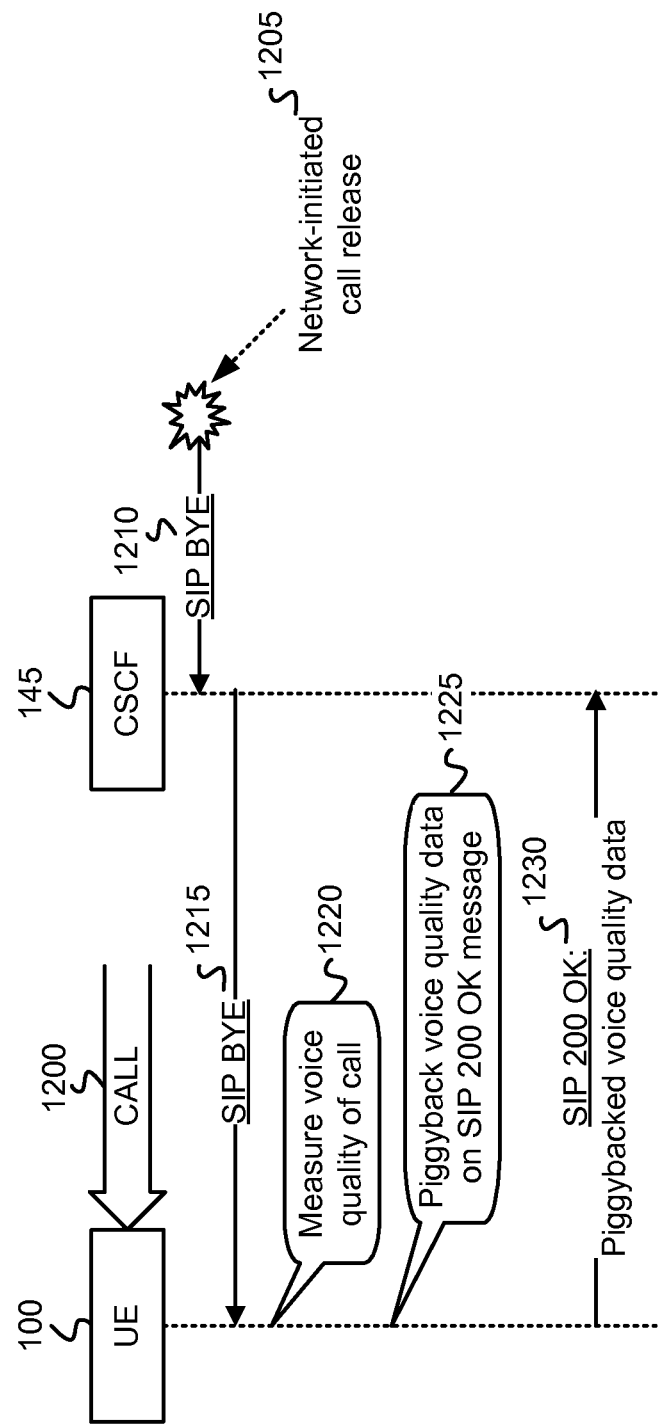
Figure 13:
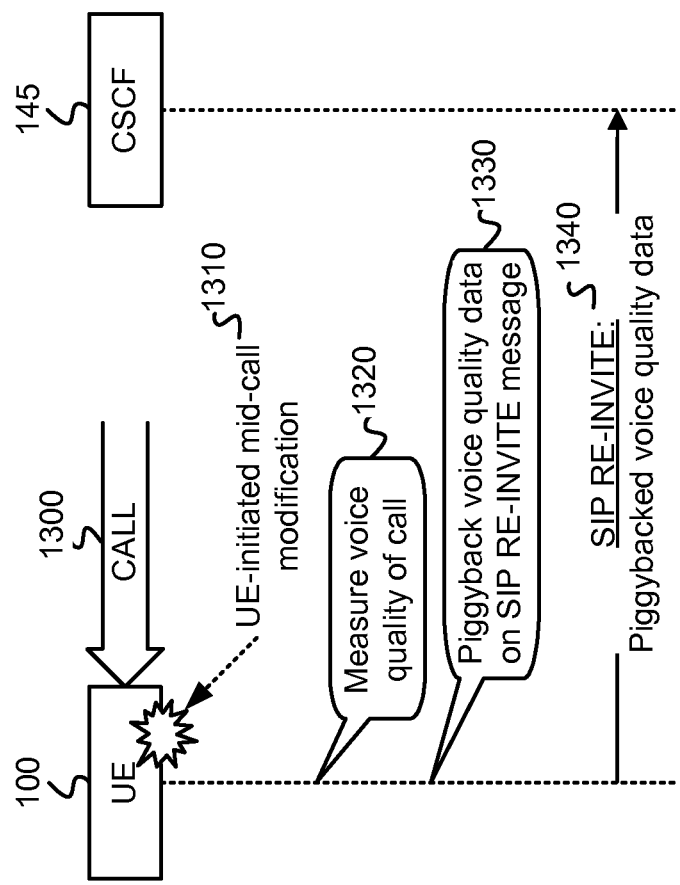
Figure 14:
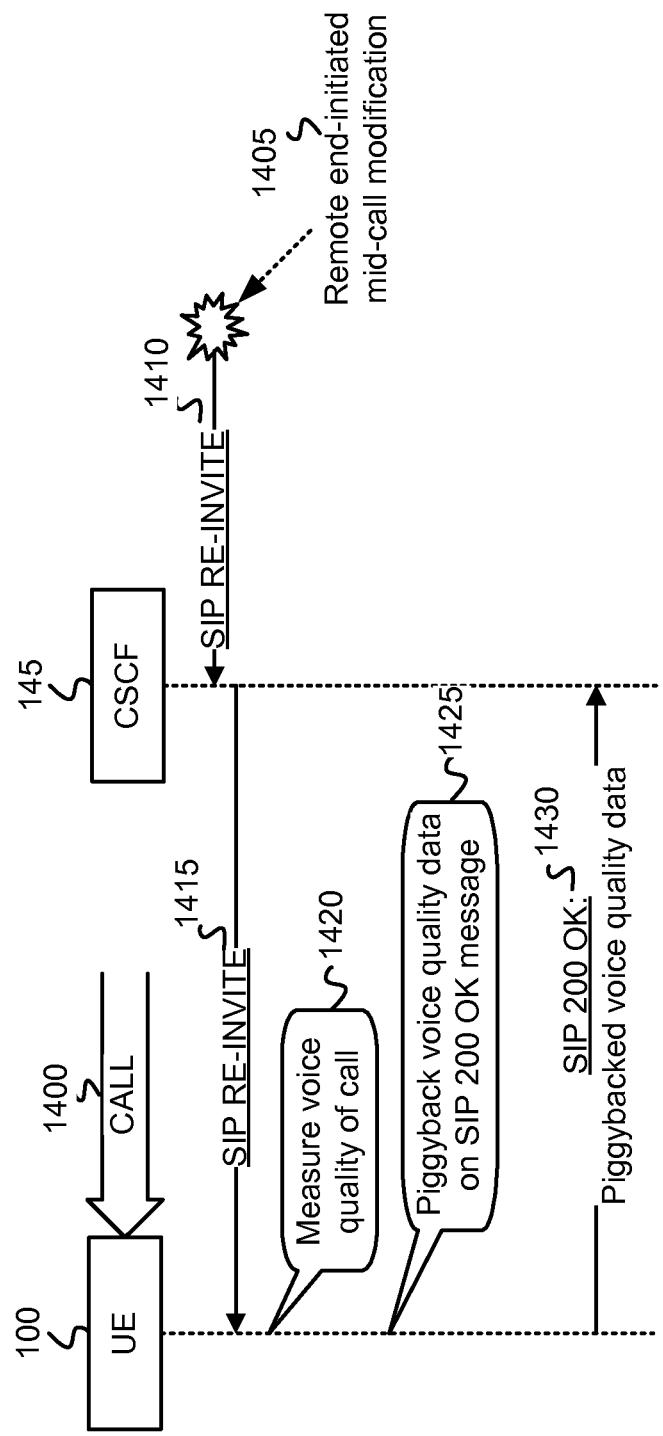

FIGS. 11-14 depict specific messaging examples associated with piggybacking voice quality data on SIP messages from a UE 100. FIG. 11 depicts the piggybacking of voice quality data in a SIP message as a consequence of a UE-initiated call release. FIG. 12 depicts the piggybacking of voice quality data on SIP messages from a UE 100 as a consequence of a network-initiated call release. FIG. 13 depicts the piggybacking of voice quality data on SIP messages from a UE 100 as a consequence of a UE-initiated mid-call modification. FIG. 14 depicts the piggybacking of voice quality data on SIP messages from a UE 100 as a consequence of a remote end-initiated mid-call modification.

In the messaging example of FIG. 11, UE 100 engages in a call 1100 with another UE (not shown). UE 100 itself may then initiate a call release 1110 (e.g., based on the user of UE 100 terminating the call). UE 100 measures 1120 the voice quality of the call, and then piggybacks 1130 the voice quality data on a SIP BYE message 1140. UE 100 sends SIP BYE message 1140 to CSCF 145 to so that the call can be released, and so CSCF 145 can generate an accounting record (not shown) that includes the voice quality data. CSCF 145 may send the accounting record to CCF 155 for bi-directional voice quality determination and report generation, as described previously herein.

In the messaging example of FIG. 12, UE 100 engages in a call 1200 with another UE (not shown). A network-initiated call release 1205 occurs and, as a result, CSCF 145 receives a SIP BYE message 1210. CSCF 145 may send a SIP BYE message 1215 to UE 100 notifying UE 100 of the termination of call 1200. UE 100 measures 1220 the voice quality of call 1200, and then piggybacks 1225 the voice quality data on a SIP 200 OK message 1230. UE 100 sends SIP 200 OK message 1230 to CSCF 145 so CSCF 145 can generate an accounting record (not shown) that includes the voice quality data. CSCF 145 may send the accounting record to CCF 155 for bi-directional voice quality determination and report generation, as described previously herein.

In the messaging example of FIG. 13, UE 100 engages in a call 1300 with another UE (not shown). UE 100 itself may then initiate a mid-call modification 1310 (e.g., based on the user of UE 100 initiating a call transfer, a call hold, a change of media type from voice call to video call, or a codec change). UE 100 measures 1320 the voice quality of the call, and then piggybacks 1330 the voice quality data on a SIP RE-INVITE message 1340. UE 100 sends SIP RE-INVITE message 1340 to CSCF 145 so CSCF 145 can generate an accounting record (not shown) that includes the voice quality data. CSCF 145 may send the accounting record to CCF 155 for bi-directional voice quality determination and report generation, as described previously herein.

In the messaging example of FIG. 14, UE 100 engages in a call 1400 with another UE (not shown). A remote-end initiated mid-call modification 1405 occurs and, as a result, CSCF 145 receives a SIP RE-INVITE message 1410. The remote-end initiated mid-call modification 1405 may occur due to a user at the UE at the other end of call 1400 modifying the call (i.e., changing media type from audio to video).

CSCF 145 may send a SIP RE-INVITE message 1415 to UE 100 notifying UE 100 of the mid-call modification of call 1400. UE 100 measures 1420 the voice quality of call 1400, and then piggybacks 1425 the voice quality data on a SIP 200 OK message 1430. UE 100 sends SIP 200 OK message 1430 to CSCF 145 so CSCF 145 can generate an accounting record (not shown) that includes the voice quality data. CSCF 145 may send the accounting record to CCF 155 for bi-directional voice quality determination and report generation, as described previously herein.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7, 9 and 10, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    engaging in communication, at a first user device with a second user device, via a call;
    measuring, at the first user device, voice quality on an inbound direction of the call at the first user device to produce voice quality data;
    determining, at the first user device, if the call is terminated or modified;
    piggybacking, at the first user device, the voice quality data on a Session Initiation Protocol (SIP) signaling message being sent to a Call Session Control Function (CSCF) in an Internet Protocol (IP) Multimedia Subsystem (IMS) network to create a piggybacked SIP signaling message, if the call is terminated or modified, wherein the CSCF is different from the first user device and the second user device; and
    sending the piggybacked SIP signaling message from the first user device to the CSCF.

2. The method of claim 1, further comprising:
    measuring, at the second user device, voice quality on an inbound direction of the call at the second user device to produce second voice quality data;
    determining, at the second user device, if the call is terminated or modified;
    piggybacking, at the second user device, the second voice quality data on a second SIP signaling message to create a piggybacked second SIP signaling message if the call is terminated or modified; and
    sending the piggybacked second SIP signaling message from the second user device to a second CSCF in the IMS network.

3. The method of claim 1, wherein determining if the call is terminated comprises:
    determining whether a user device-initiated call release has occurred; and
    determining whether a network-initiated call release has occurred.

4. The method of claim 1, wherein determining if the call is modified comprises:
    determining whether the first user device has initiated a mid-call modification; and
    determining whether the second user device has initiated the mid-call modification.

5. The method of claim 4, wherein the mid-call modification comprises a call transfer, a call hold, a change of media type from voice call to video call, or a codec change.

6. The method of claim 1, wherein the first SIP signaling message comprises a SIP BYE message, a SIP 200 OK message, or a SIP RE-INVITE message.

7. The method of claim 1, wherein the first and the second user devices each comprise one of a land-line or mobile telephone; a personal digital assistant (PDA); or a tablet, desktop, palmtop, or laptop computer.

8. A method, comprising:
    receiving, at a first network device from a first user device engaged in a call with a second user device, a first Session Initiation Protocol (SIP) signaling message piggybacked with first data related to a voice quality of an inbound direction of the call at the first user device, wherein the first network device is different from the first user device and the second user device;
    receiving, at a second network device, from a second user device engaged in the call with the first user device, a second Session Initiation Protocol (SIP) signaling message piggybacked with second data related to a voice quality of an inbound direction of the call at the second user device;
    extracting, at the first network device, the first data related to the voice quality from the first SIP signaling message;
    extracting, at the second network device, the second data related to the voice quality from the second SIP signaling message; and
    determining a bi-directional voice quality of the call based on the first data and the second data.

9. The method of claim 8, further comprising:
    generating a voice quality report of the call using the determined bi-directional voice quality.

10. The method of claim 8, wherein receiving, from the first user device engaged in the call with the second user device, the first SIP signaling message comprises:
    receiving the first SIP signaling message responsive to a termination or modification of the call between the first and the second user devices.

11. The method of claim 8, wherein receiving, from the second user device engaged in the call with the first user device, a second SIP signaling message comprises:

receiving the second SIP signaling message responsive to a termination or modification of the call between the second user device and the first user device.

12. The method of claim 8, wherein the first and the second SIP signaling messages each comprise a SIP BYE message, a SIP 200 OK message, or a SIP RE-INVITE message.

13. The method of claim 8, wherein the first and second network devices are a same network device.

14. A first device, comprising:
   a communication interface configured to:
      communicate via a call with a second device via a transport network, and
      measure voice quality on an inbound direction of the call at the first device to produce voice quality data; and
   a processing unit configured to:
      determine if the call is terminated or modified;
      insert the voice quality data into a Session Initiation Protocol (SIP) signaling message if the call is terminated or modified, and
      send, via the communication interface, the SIP signaling message, with the inserted voice quality data, from the first device to a first Call Session Control Function (CSCF) in an Internet Protocol (IP) Multimedia Subsystem (IMS) network, wherein the CSCF is different from the first device and the second device.

15. The first device of claim 14, wherein, when determining if the call is terminated, the processing unit is configured to:
   determine whether a user device-initiated call release has occurred, and
   determine whether a network-initiated call release has occurred.

16. The first device of claim 14, wherein, when determining if the call is modified, the processing unit is configured to:
   determine whether the first device has initiated a mid-call modification, and
   determine whether the second device has initiated the mid-call modification.

17. The first device of claim 16, wherein the mid-call modification comprises a call transfer, a call hold, a change of media type from voice call to video call, or a codec change.

18. The first device of claim 14, wherein the SIP signaling message comprises a SIP BYE message, a SIP 200 OK message, or a SIP RE-INVITE message.

19. The first device of claim 14, wherein the first device comprises a land-line or mobile telephone; a personal digital assistant (PDA); or a tablet, desktop, palmtop, or laptop computer.

20. A system, comprising:
   a call session control function implemented at a first network device and configured to:
      receive, from a first user device engaged in a call with a second user device, a first Session Initiation Protocol (SIP) signaling message piggybacked with first data related to a voice quality of an inbound direction of the call at the first user device, wherein the call session control function is different from the first user device and the second user device,
      receive, from the second user device engaged in the call with the first user device, a second SIP signaling message piggybacked with second data related to a voice quality of an inbound direction of the call at the second user device,
      extract the first data related to the voice quality from the first SIP signaling message,
      extract the second data related to the voice quality from the second SIP signaling message, and
      send the extracted first and second data to a Charging Collection Function (CCF), wherein the CCF is implemented at a second network device and is configured to determine a bi-directional voice quality of the call based on the first data and the second data.

21. The system of claim 20, further comprising the CCF and wherein the CCF is further configured to:
   generate a voice quality report of the call using the determined bi-directional voice quality.

22. The system of claim 20, wherein the first and the second SIP signaling messages each comprise a SIP BYE message, a SIP 200 OK message, or a SIP RE-INVITE message.

23. The system of claim 20, wherein the first network device is a different network device than the second network device.

24. The system of claim 20, wherein the first network device and the second network device are a same network device.

25. The system of claim 20, wherein the call session control function is further configured to:
   generate an accounting record, wherein the accounting record includes the first and second data, and
   wherein sending the extracted first and second data comprises sending the accounting record to the CCF.

* * * * *